(12) United States Patent
Zhou et al.

(10) Patent No.: US 9,939,684 B2
(45) Date of Patent: Apr. 10, 2018

(54) MANUFACTURING METHOD OF DISPLAY SUBSTRATE, MANUFACTURING METHOD OF DISPLAY PANEL, AND DISPLAY DEVICE

(71) Applicants: Boe Technology Group Co., Ltd., Beijing (CN); Beijing Boe Optoelectronics Technology Co., Ltd., Beijing (CN)

(72) Inventors: Yongshan Zhou, Beijing (CN); Jingpeng Li, Beijing (CN); Sunghun Song, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/022,595

(22) PCT Filed: Aug. 21, 2015

(86) PCT No.: PCT/CN2015/087777
§ 371 (c)(1),
(2) Date: Mar. 17, 2016

(87) PCT Pub. No.: WO2016/173157
PCT Pub. Date: Nov. 3, 2016

(65) Prior Publication Data
US 2017/0059903 A1 Mar. 2, 2017

(30) Foreign Application Priority Data
Apr. 29, 2015 (CN) .......................... 2015 1 0210499

(51) Int. Cl.
*G02F 1/1333* (2006.01)
*G02F 1/1339* (2006.01)
*G02F 1/1337* (2006.01)

(52) U.S. Cl.
CPC .......... *G02F 1/1339* (2013.01); *G02F 1/1333* (2013.01); *G02F 1/133788* (2013.01); *G02F 2001/133354* (2013.01)

(58) Field of Classification Search
CPC ................... G02F 1/1337–1/133711
See application file for complete search history.

(56) References Cited

U.S. PATENT DOCUMENTS 6,451,392 B1 * 9/2002 Ootake ............. G02F 1/133719
428/1.23
2008/0032215 A1 2/2008 Lai et al.

FOREIGN PATENT DOCUMENTS

| CN | 101498858 | 8/2009 |
|----|-----------|--------|
| CN | 102087440 | 6/2011 |

(Continued)

OTHER PUBLICATIONS

Office action from Chinese Application No. 201510210499.3 dated Mar. 9, 2017.

(Continued)

*Primary Examiner* — Mariceli Santiago
(74) *Attorney, Agent, or Firm* — Calfee, Halter & Griswold LLP

(57) ABSTRACT

The present disclosure discloses a manufacturing method of a display substrate, a manufacturing method of a display panel and a display device. The manufacturing method of a display substrate comprises: performing an pre-irradiation on the display substrate with ultraviolet light after completion of alignment of an alignment layer of the display substrate, such that electrons in a metal layer of the display substrate receive energy under this irradiation of the ultra- (Continued)

violet light and thereby transfer, and are distributed uniformly in the alignment layer of the display area of the display substrate. A uniform distribution of charges in the whole display area would not result in the deficiency of non-uniform brightness at the edge of the display area.

15 Claims, 2 Drawing Sheets

(56) References Cited

FOREIGN PATENT DOCUMENTS

| | | | | |
|---|---|---|---|---|
| CN | 102650759 | | 8/2012 | |
| CN | 102707498 | | 10/2012 | |
| CN | 104765213 | | 7/2015 | |
| JP | 11281984 A | * | 10/1999 | ............ B82Y 30/00 |
| JP | 2000056309 A | * | 2/2000 | ............ B82Y 30/00 |
| JP | 2007199450 | | 8/2007 | |

OTHER PUBLICATIONS

International Search Report and Written Opinion from PCT/CN15/087777 dated Jan. 12, 2016.
International Search Report and Written Opinion from PCT/CN15/08777 dated Jan. 12, 2016.
Second Office action from Chinese Application No. 201510210499.3 dated Nov. 6, 2017.

\* cited by examiner

MANUFACTURING METHOD OF DISPLAY SUBSTRATE, MANUFACTURING METHOD OF DISPLAY PANEL, AND DISPLAY DEVICE

RELATED APPLICATIONS

The present application is the U.S. national phase entry of PCT/CN2015/087777, with an international filling date of Aug. 21, 2015, which claims the benefit of Chinese Patent Application No. 201510210499.3, filed on Apr. 29, 2015, the entire disclosure of which are incorporated herein by reference.

TECHNICAL FIELD

The present disclosure relates to the field of display technologies, and particularly to a manufacturing method of a display substrate, a manufacturing method of a display panel, and a display device.

BACKGROUND

In recent years, as the popularization of digital televisions, the traditional CRT display tends to be replaced by new-generation displays due to its shortcomings including difficulty in digitalization, large volume, large weight, being radioactive, and the like. The liquid crystal display has been popularized and become a dominant product due to its advantages including small weight, small volume, no radiation, low power consumption, good display effect, and so on. The process for manufacturing the liquid crystal panel comprises the steps of: manufacturing an array substrate, performing cell-assembling and manufacturing modules. The cell-assembling process further comprises the steps of: printing a liquid crystal alignment film, performing alignment by rubbing the liquid crystal alignment film, applying a seal agent, injecting liquid crystal, performing cell-assembling of the array substrate with a color filter substrate, and curing the seal agent.

FIG. 1 shows a sectional schematic diagram of a display panel on which an operation of seal agent curing is performed. As shown in FIG. 1, following cell-assembling of an array substrate 1 with a color filter substrate 2, a liquid crystal layer 3 located between the array substrate 1 and the color filter substrate 2 is enclosed by a seal agent 5. The sides of the array substrate 1 and the color filter substrate 2 which contact the liquid crystal layer 3 are applied with an alignment layer 4.

When curing the seal agent, ultraviolet light (indicated by the upward arrows in FIG. 1) is used to irradiate the display panel after cell-assembling. Due to poor design precision of a mask plate 6 used for curing the seal agent and divergence of the ultraviolet light, the display area of the display panel also receives a certain amount of ultraviolet radiation. As shown in FIG. 1, the distance between the mask plate 6 and the seal agent 5 is d. The ultraviolet light irradiates from the area with a width of d to the periphery of the display area of the display panel, thereby inevitably irradiating the metal layer (e.g. pixel electrode layer, etc) at the edge of the display area of the array substrate 1, such that electrons of the metal layer receive energy and hence transfer. When the electrons transfer to the alignment layer 4 in contact with the edge of the display area, they would have impact on the deflection of liquid crystal molecules located in the display area, thereby resulting in deficiencies such as non-uniform brightness at the edge of the display area. This influences the quality of picture significantly.

SUMMARY

Embodiments of the present disclosure provide a manufacturing method of a display substrate to decrease impact of the ultraviolet irradiation subsequently performed for curing the seal agent on the display area, and further provide a manufacturing method of a display panel and a display device.

According to a first aspect of the present disclosure, a method for manufacturing a display substrate is provided. The display substrate comprises an alignment layer and a metal layer. The method comprises: irradiating the display substrate with ultraviolet light for a first time after completion of alignment of the alignment layer, such that electrons of the metal layer transfer to the alignment layer.

In some implementations, the ultraviolet light has a wavelength in the range of 200 to 400 nm.

In some implementations, the ultraviolet light has an illuminance of greater than 500 lux.

In some implementations, the display substrate is an array substrate, and the metal layer comprises a pixel electrode layer.

In some implementations, the display substrate is a color filter substrate, and the metal layer comprises a common electrode layer.

According to a second aspect of the present disclosure, a method for manufacturing a display panel is provided. The display panel comprises a display substrate. The method comprises: manufacturing the display substrate using the method for manufacturing a display substrate as defined in the first aspect.

In some implementations, the method further comprises: manufacturing an opposite substrate, the opposite substrate being used for cell-assembling with the display substrate to form a display panel; applying a seal agent on the display substrate or opposite substrate; performing cell-assembling of the display substrate with the opposite substrate; and providing liquid crystal between the display substrate and the opposite substrate.

In some implementations, the method further comprises: subsequent to cell-assembling of the display substrate with the opposite substrate, irradiating the seal agent with ultraviolet light for a second time to complete curing of the seal agent. The ultraviolet light for the second time of irradiation has a wavelength greater than or equal to that of the ultraviolet light for the first time of irradiation, and the ultraviolet light for the second time of irradiation has an illuminance less than or equal to that of the ultraviolet light for the first time of irradiation.

According to a third aspect, a display device is provided, which comprises a display panel manufactured by the above mentioned method for manufacturing a display panel.

The present disclosure is based on the following concept: a pre-irradiation is performed on the display substrate with ultraviolet light after alignment of the alignment layer of the display substrate has been completed, such that electrons in the metal layer of the display substrate receive energy under the irradiation of the ultraviolet light and thereby transfer, and are uniformly distributed in the alignment layer of the display area of the display substrate. In this way, although charges are distributed in the alignment layer, they are distributed uniformly within the whole display area and influence the liquid crystal molecules at the periphery of the display area and at the center of the display area in a consistent manner, which would not result in deficiencies such as non-uniform brightness at the edge of the display area.

DETAILED DESCRIPTION

To enable those skilled in the art to better understand the technical solution of the present disclosure, the present disclosure is further described in detail below in combination with the drawings and specific embodiments. The following reference signs will be used throughout the specification and accompanying figures:

1—array substrate; 2—color filter substrate; 3—liquid crystal layer; 4—alignment layer; 5—seal agent; 6—mask plate; 7—pixel electrode layer; 8—common electrode layer; d—distance between the seal agent and the mask plate.

Figure 2:
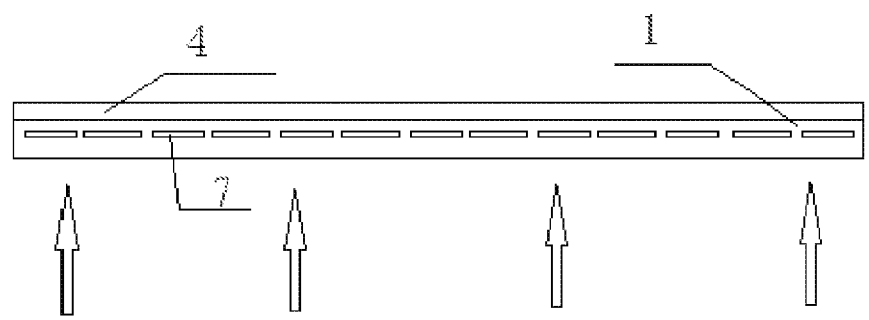
FIG. 2 is a sectional schematic diagram of an array substrate on which an operation of irradiation is being performed with ultraviolet light for a first time according to an embodiment of the present disclosure.
Figure 3:
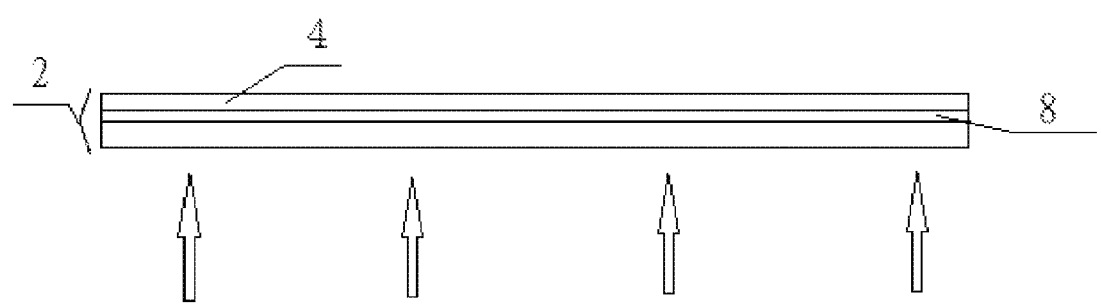
FIG. 3 is a sectional schematic diagram of a color filter substrate on which an operation of irradiation is being performed with ultraviolet light for a first time according to an embodiment of the present disclosure.

The display substrate as described herein usually comprises an array substrate and a color filter substrate. FIG. 2 is a sectional schematic diagram of an array substrate 1 on which an operation of irradiation is being performed with ultraviolet light for a first time according to an embodiment of the present disclosure, and FIG. 3 is a sectional schematic diagram of a color filter substrate 2 on which an operation of irradiation is being performed with ultraviolet light for a first time according to an embodiment of the present disclosure. As shown in FIG. 2, the metal layer of the array substrate 1 comprises a pixel electrode layer 7. As shown in FIG. 3, the metal layer of the color filter substrate 2 comprises a common electrode layer 8.

In manufacturing the display substrate (array substrate and/or color filter substrate), a pre-irradiation may be performed on the display substrate with ultraviolet light after an alignment layer 4 of the display substrate has been aligned, such that electrons in the metal layer of the display substrate transfer to the alignment layer 4.

More specially, the ultraviolet pre-irradiation allows the electrons in the metal layer of the display substrate to receive energy under the irradiation of the ultraviolet light and thereby transfer, and to be distributed uniformly in the alignment layer 4 of the display area of the display substrate. In this way, although charges are distributed in the alignment layer 4, the charges are distributed uniformly within the whole display area and influence the liquid crystal molecules at the periphery of the display area and at the center of the display area in a consistent manner, which would not result in deficiencies such as non-uniform brightness at the edge of the display area.

In an example, the wavelength of the ultraviolet light ranges from 200 to 400 nm. Under irradiation of ultraviolet light with a wavelength in such a range, the electrons of the metal layer are easy to be excited and thereby transfer; moreover the seal agent can be cured within this wavelength range.

In an example, the luminance of the ultraviolet light is greater than 500 lux. Under such luminance, the electrons of the metal layer receive sufficient energy and thereby transfer. In this way, all the electrons that can be excited under the above wavelengths of the ultraviolet light may be excited and transfer.

It should be understood that the display panel may comprise other metal layers. The pixel electrode layer and common electrode layer described above are only for purposes of illustration. The metal layer may be different for different types of display panels.

It should be understood that, prior to irradiating (pre-irradiating) the display substrate with ultraviolet light for the first time, the following steps may be performed: manufacturing other functional layers on the display substrate, and applying to the display substrate that has the functional layers manufactured the alignment layer and rubbing the alignment layer. All of these steps pertain to the prior art, which are not described here in detail for simplicity.

After the display substrate has been manufactured using the method as described above, the following steps may be further performed to prepare a display panel.

At step S1, an opposite substrate is manufactured. The opposite substrate is used for cell-assembling with the display substrate to form a display panel.

When the display substrate refers to the array substrate, the opposite substrate may refer to the color filter substrate, and vice verse. In addition, the sides of the manufactured array substrate and color filter substrate which face the liquid crystal each comprise an alignment layer 4. Alignment is performed by rubbing the alignment layer 4. Applying and rubbing of the alignment layer 4 both pertain to the prior art, which are not described in detailed here for simplicity.

At step S2, the display substrate or opposite substrate is applied with a seal agent.

In particular, the seal agent 5 may be applied to the areas on the color filter substrate 2 which are opposite to the periphery of the display area of the array substrate 1. Of course, the seal agent 5 may be applied directly to the periphery of the display area of the array substrate 1. A specific scheme may be selected based on practical situations.

At step S3, cell-assembling of the display substrate with the opposite substrate is performed.

For example, cell-assembling of the array substrate 1 with the color filter substrate 2 that is applied with the seal agent 5 is performed, such that the seal agent 5 on the color filter substrate 5 encloses the display area on the array substrate 1. This way a display panel is formed. An alignment device can be used during the cell-assembling to enable the seal agent 5 of each display panel to enclose a respective display area.

At step S4, liquid crystal is provided between the display substrate and the opposite substrate.

A liquid crystal layer 3 is formed by dropping liquid crystal into the display area of the display panel that has experienced cell-assembling. It should be understood that the liquid crystal may also be dropped on the array substrate 1 or the color filter substrate 2 prior to the cell-assembling. A specific scheme can be selected based on practical situations.

It should be understood that a liquid crystal dropping device and a positioning device may be employed during the liquid crystal dropping operation, both of which pertain to the prior art and are not described here in detail for simplicity.

Figure 1:
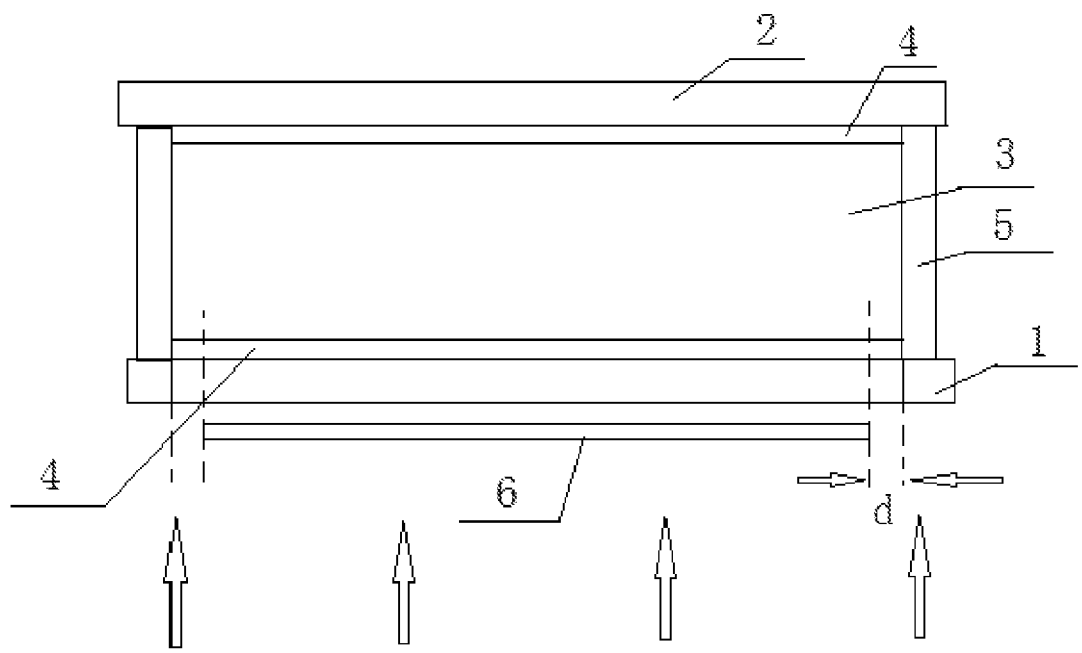
FIG. 1 shows a sectional schematic diagram of a display panel on which an operation of seal agent curing is being performed.

Referring back to FIG. 1, the display panel may be irradiated after the cell-assembling with ultraviolet light for a second time to complete curing of the seal agent 5. In particular, the ultraviolet light for the second time of irradiation may have a wavelength greater than or equal to that of the ultraviolet light for the first time of irradiation, and the ultraviolet light for the second time of irradiation may have an illuminance less than or equal to that of the ultraviolet light for the first time of irradiation.

By doing so, the electrons of the metal layer of the irradiated array substrate 1 would not transfer for a second time, because they have transferred during the first time of irradiation and are distributed uniformly in the alignment layer 4. The second time of ultraviolet irradiation only achieves curing of the seal agent 5 and would not lead to transfer of the electrons of the metal layer of the array substrate 1.

Therefore, a uniform distribution of the charges of the alignment layer 4 of the display panel that has experienced the ultraviolet curing may still be achieved. The impact on the liquid crystal modules is consistent within the whole display area, which would not result in the deficiency of non-uniform brightness and further influence the quality of display.

According to another aspect of the present disclosure, a display device is provided, which comprises a display panel manufactured by the above-mentioned method for manufacturing a display panel.

It can be understood that the above embodiments are exemplary embodiments used only for illustrating the principle of the present disclosure, and that the present disclosure is not so limited. Various variations and improvements may be made by those ordinarily skilled in the art without departing from the spirit and essence of the present disclosure. These variations and improvements are regarded as falling within the scope of the present disclosure.

The invention claimed is:

1. A method for manufacturing a display substrate, said display substrate comprising an alignment layer and a metal layer, said method comprising:
    irradiating said display substrate with ultraviolet light having a illuminance of greater than 500 lux for a first time after completion of alignment of said alignment layer, such that electrons of said metal layer transfer to said alignment layer.

2. The method as defined in claim 1, wherein said ultraviolet light has a wavelength in the range of 200 to 400 nm.

3. A method for manufacturing a display panel, said display panel comprising a display substrate, said method comprising:
    manufacturing said display substrate using the method as defined in claim 2.

4. The method as defined in claim 1, wherein said display substrate is an array substrate, and said metal layer comprises a pixel electrode layer.

5. A method for manufacturing a display panel, said display panel comprising a display substrate, said method comprising:
    manufacturing said display substrate using the method as defined in claim 4.

6. The method as defined in claim 1, wherein said display substrate is a color filter substrate, and said metal layer comprises a common electrode layer.

7. A method for manufacturing a display panel, said display panel comprising a display substrate, said method comprising:
    manufacturing said display substrate using the method as defined in claim 6.

8. A method for manufacturing a display panel comprising a display substrate, said method comprising:
    manufacturing said display substrate using the method as defined in claim 1.

9. The method as defined in claim 8, said display panel further comprising an opposite substrate, a seal agent and liquid crystal, said method further comprising:
    manufacturing said opposite substrate, wherein said opposite substrate is used for cell-assembling with said display substrate to form said display panel;
    applying said seal agent on said display substrate or said opposite substrate;
    performing cell-assembling of said display substrate with said opposite substrate; and
    providing liquid crystal between said display substrate and said opposite substrate.

10. The method as defined in claim 9, further comprising:
    subsequent to cell-assembling of said display substrate with said opposite substrate, irradiating said seal agent with ultraviolet light for a second time to complete curing of said seal agent, the ultraviolet light for the second time of irradiation having a wavelength greater than or equal to that of the ultraviolet light for the first time of irradiation, the ultraviolet light for the second time of irradiation having a luminance less than or equal to that of the ultraviolet light for the first time of irradiation.

11. A display device, comprising:
    a display panel comprising a display substrate, said display substrate comprising an alignment layer and a metal layer,
    wherein said display substrate is produced by being irradiated with ultraviolet light having a illuminance of greater than 500 lux after completion of alignment of said alignment layer such that electrons of said metal layer transfer to said alignment layer.

12. A display substrate, comprising:
    an alignment layer; and
    a metal layer,
    wherein said display substrate is produced by being irradiated with ultraviolet light having a illuminance of greater than 500 lux after completion of alignment of said alignment layer such that electrons of said metal layer transfer to said alignment layer.

13. The display substrate as defined in claim 12, wherein said ultraviolet light has a wavelength in the range of 200 to 400 nm.

14. The display substrate as defined in claim 12, wherein said display substrate is an array substrate, and said metal layer comprises a pixel electrode layer.

15. The display substrate as defined in claim 12, wherein said display substrate is a color filter substrate, and said metal layer comprises a common electrode layer.

* * * * *